United States Patent
Lee

(10) Patent No.: US 12,283,897 B2
(45) Date of Patent: Apr. 22, 2025

(54) MODULAR MULTI-LEVEL CONVERTER

(71) Applicant: LS ELECTRIC CO., LTD., Anyang-si (KR)

(72) Inventor: Chul Kyun Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 226 days.

(21) Appl. No.: 18/020,563

(22) PCT Filed: Dec. 7, 2021

(86) PCT No.: PCT/KR2021/018401
§ 371 (c)(1),
(2) Date: Feb. 9, 2023

(87) PCT Pub. No.: WO2022/131650
PCT Pub. Date: Jun. 23, 2022

(65) Prior Publication Data
US 2023/0318483 A1    Oct. 5, 2023

(30) Foreign Application Priority Data
Dec. 15, 2020  (KR) ........................ 10-2020-0175217

(51) Int. Cl.
*H02M 7/48* (2007.01)
*H02M 3/158* (2006.01)
(Continued)

(52) U.S. Cl.
CPC ....... *H02M 7/4835* (2021.05); *H02M 3/1584* (2013.01); *H02M 7/49* (2013.01)

(58) Field of Classification Search
CPC .... H02M 3/1582; H02M 3/156; H02M 3/157; H02M 3/158; H02M 3/1584;
(Continued)

(56) References Cited

U.S. PATENT DOCUMENTS 9,219,423 B2 * 12/2015 Lv ...................... H02M 7/4835
10,193,469 B2 * 1/2019 Harnefors ............. H02M 7/483
(Continued)

FOREIGN PATENT DOCUMENTS

CN           105946849 A     9/2016
KR         20170088693 A     8/2017
(Continued)

OTHER PUBLICATIONS

Office Action for related Korean Application No. 10-2020-0175217; action dated May 26, 2023; (4 pages).
(Continued)

*Primary Examiner* — Jeffrey A Gblende
(74) *Attorney, Agent, or Firm* — K&L Gates LLP

(57) ABSTRACT

The present disclosure relates to a modular multi-level converter, wherein a cluster comprises multiple sub-modules connected to each other in series and multiple individual reactors connected to the respective sub-modules in series, and the multiple individual reactors are disposed between the multiple sub-modules, respectively. Therefore, the converter of the present invention is advantageous in that the volume thereof can be further reduced compared with when a conventional large-capacity reactor is used.

10 Claims, 9 Drawing Sheets

(51) Int. Cl.
*H02M 7/483* (2007.01)
*H02M 7/49* (2007.01)

(58) Field of Classification Search
CPC ............... H02M 3/1586; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/08; H02M 3/1588; H02M 7/5395; H02M 1/14; H02M 1/0043; H02M 1/0074; H02M 1/0077; H02M 7/519; H02M 7/521; H02M 7/523; H02M 7/75; H02M 7/757; H02M 7/7575; H02M 7/66; H02M 7/68; H02M 7/72; H02M 2007/4835; H02M 7/487; H02M 7/515; H02M 7/525; H02M 7/527; H02M 7/529; H02M 7/539; H02J 3/46; H02J 3/38
See application file for complete search history.

(56) References Cited

U.S. PATENT DOCUMENTS

| | | |
|---|---|---|
| 10,700,617 B1 | 6/2020 | Moustafa Abdelrazek et al. |
| 2003/0231046 A1* | 12/2003 | Giacomini ..... H03K 19/018557 327/333 |
| 2017/0187276 A1* | 6/2017 | Townsend ............... H02M 7/00 |
| 2018/0138825 A1 | 5/2018 | Harnefors et al. |

FOREIGN PATENT DOCUMENTS

| | | |
|---|---|---|
| WO | 2013156050 A1 | 10/2013 |
| WO | 2017000984 A1 | 1/2017 |
| WO | 110571815 A | 12/2019 |

OTHER PUBLICATIONS

International Search Report for related International Application No. PCT/KR2021/018401; action dated Jun. 23, 2022; (6 pages).
Written Opinion for related International Application No. PCT/KR2021/018401; action dated Jun. 23, 2022; (3 pages).

* cited by examiner

MODULAR MULTI-LEVEL CONVERTER

CROSS-REFERENCE TO RELATED APPLICATIONS

This application is the National Stage filing under 35 U.S.C. 371 of International Application No. PCT/KR2021/018401, filed on Dec. 7, 2021, which claims the benefit of earlier filing date and right of priority to Korea utility model Application No. 10-2020-0175217 filed on Dec. 15, 2020, the contents of which are all hereby incorporated by reference herein in their entirety.

FIELD

The present disclosure relates to a modular multi-level converter.

BACKGROUND

A modular Multi-Level Converter (MMC) is a device that converts AC power into DC power or converts DC power into AC power using a plurality of sub-modules, and operates by controlling each sub-module in charge, discharge, and bypass state.

Modular multi-level converters (MMCs) are mainly used in high voltage direct current transmission (HVDC) systems and static synchronous compensators (STATCOMs).

The modular multi-level converter includes a cluster composed of a plurality of sub-modules connected in series to each other for each of three phases.

Also, in the modular multi-level converter, one arm reactor is provided in each three-phase cluster. The arm reactor is connected in series to the sub-module to prevent damage to the sub-module due to a short circuit. Also, the arm reactor is connected to limit current flowing to a load within allowable current.

However, as the number of sub-modules increases, the capacity of the arm reactor also increases, and when a large-capacity reactor is installed, the physical size of the reactor increases, resulting in an increase in the volume of a product.

SUMMARY

The present disclosure is to provide an arrangement structure of an arm reactor in a modular multi-level converter device.

A modular multi-level converter of the present disclosure may comprise a cluster. The cluster may comprise a plurality of sub-modules connected in series and a plurality of individual reactors connected to the sub-modules in series, and each of the plurality of individual reactors may be disposed between the plurality of sub-modules.

The number of sub-modules may be less than or equal to the number of individual reactors.

One end of a first sub-module of the plurality of sub-modules may be connected to a first individual reactor and the other end of the first sub-module may be connected to a second individual reactor.

The plurality of sub-modules and the plurality of individual reactors may be disposed in the same space.

Any one of the plurality of individual reactors may be disposed inside the sub-module.

A modular multi-level converter of the present disclosure may comprise first to third phase clusters connected to each phase of a three-phase power system in parallel. Each of the first to third phase clusters may comprise a plurality of sub-modules connected in series and a plurality of individual reactors connected to the sub-modules in series, and each of the plurality of individual reactors may be disposed between the plurality of sub-modules.

The number of sub-modules may be less than or equal to the number of individual reactors.

One end of a first sub-module of the plurality of sub-modules may be connected to a first individual reactor and the other end of the first sub-module may be connected to a second individual reactor.

The plurality of sub-modules and the plurality of individual reactors may be disposed in the same space.

Any one of the plurality of individual reactors may be disposed inside the sub-module.

According to the present disclosure, by arranging a reactor in or between sub-modules, there is an advantage in utilizing space and reducing the volume of a product.

According to the present disclosure, since a separate space for installing a reactor is not required, product installation costs are reduced.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" or "unit" may be used to refer to elements or components. Use of such a suffix herein is merely intended to facilitate description of the specification, and the suffix itself is not intended to have any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1:
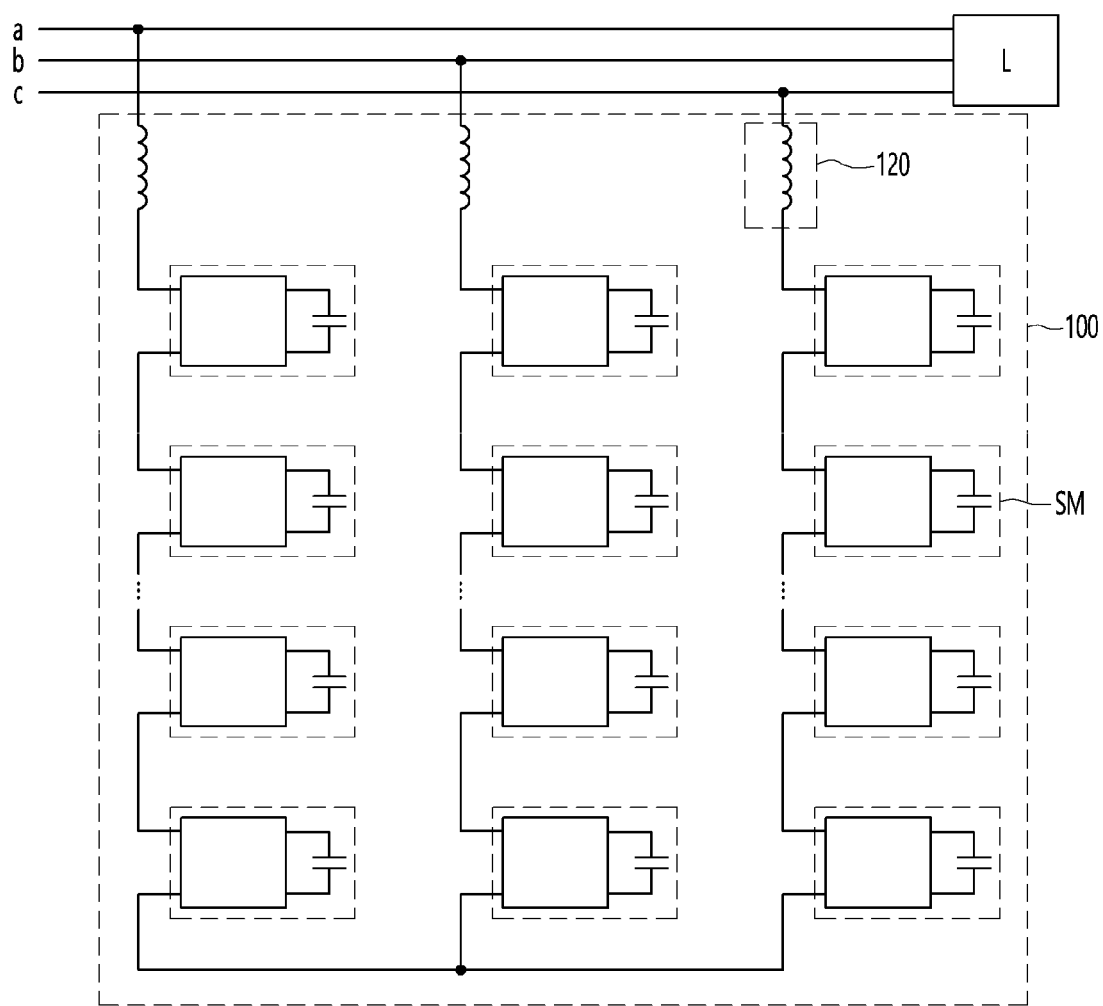
FIG. 1 is a schematic circuit diagram showing a modular multi-level converter.

FIG. 1 is a schematic circuit diagram showing a modular multi-level converter.

Referring to FIG. 1, the modular multi-level converter 100 may include a plurality of sub-modules SM and an arm reactor 120.

In the present disclosure, since a connection relationship between the plurality of sub-modules SM and the arm reactor 120 is described, the remaining components of the modular multi-level converter 100 are not illustrated in detail.

The plurality of sub-modules SM may be connected in series.

The modular multi-level converter 100 may output an output voltage as a sum of voltages formed by the plurality of sub-modules SM.

At this time, the output voltage may form +Vdc, −Vdc, and 0 in each of the plurality of sub-modules SM, and may be a sum of the voltages of the plurality of sub-modules SM connected in series.

Each of the plurality of sub-modules SM includes a capacitor (C). Therefore, when the number of sub-modules SM increases, the capacity of the arm reactor 120 also increases.

Next, the first to third connection forms of the modular multi-level converter will be described through FIGS. 2 to 4.

Figure 2:
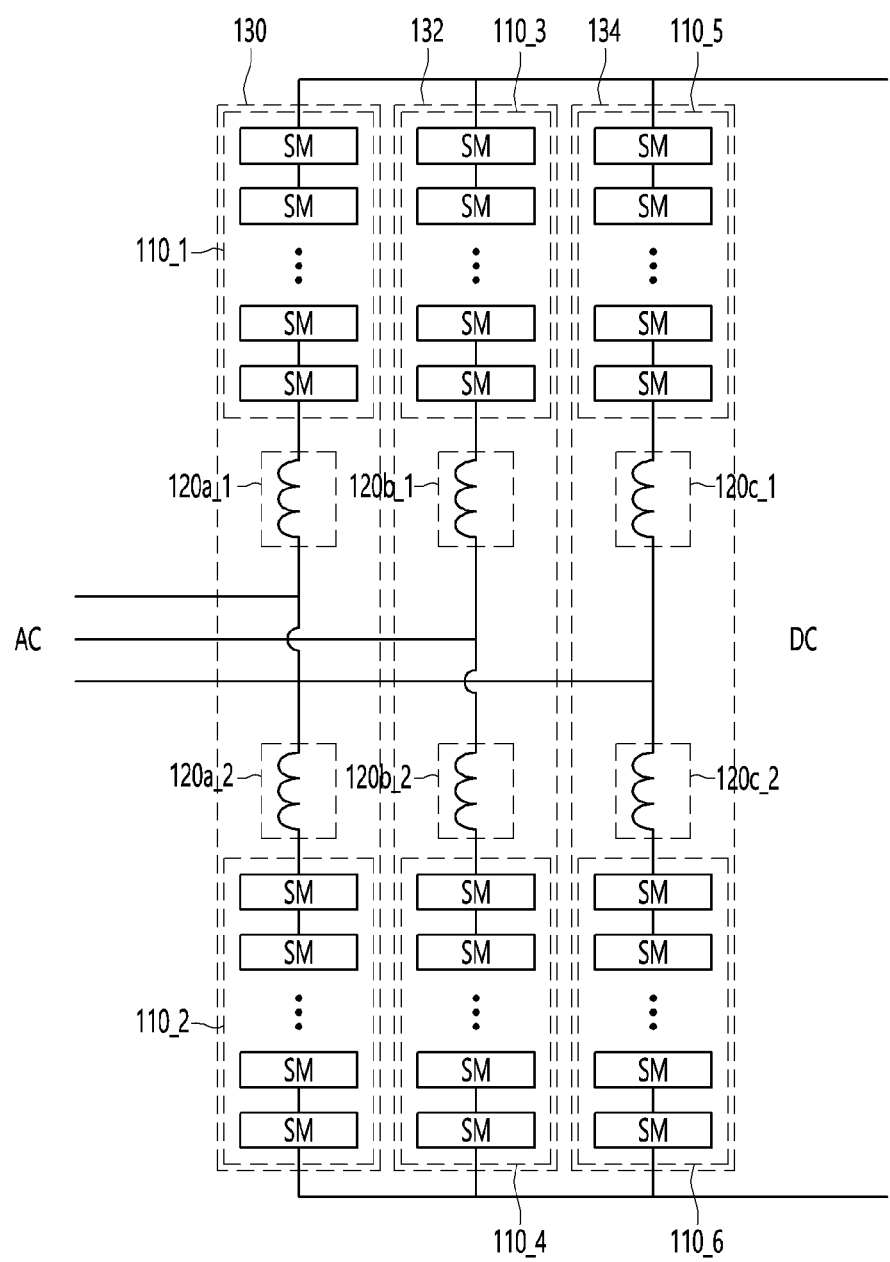
FIG. 2 is a circuit diagram showing a first connection form of the modular multi-level converter.

FIG. 2 is a circuit diagram showing a first connection form of the modular multi-level converter.

Referring to FIG. 2, the plurality of sub-modules SM may be connected in series. In this case, the plurality of sub-modules SM_1, SM_2, ..., SM_n connected to an anode or cathode of any one phase constituting 3 phases constitute one arm 110_1 to 110_6.

According to an embodiment, the modular multi-level converter 100 is a 3-phase MMC and may be composed of 6 arms and 6 arm reactors. Specifically, for each of the three phases of A, B, and C, it may be composed of six arms including an anode (+) and a cathode (−), and six arm reactors respectively connected in series to the six arms.

Referring to FIG. 1, the modular multi-level converter 100 includes a first arm 110_1 composed of the plurality of sub-modules SM_1, SM_2, ..., SM_n for the A-phase anode, a second arm 110_2 composed of the plurality of sub-modules SM_1, SM_2, ..., SM_n for the A-phase cathode, a third arm 110_3 composed of the plurality of sub-modules SM_1, SM_2, ..., SM_n for the B-phase anode, a fourth arm 110_4 composed of the plurality of sub-modules SM_1, SM_2, ..., SM_n for the B-phase cathode, a fifth arm 110_5 composed of the plurality of sub-modules SM_1, SM_2, ..., SM_n for the C-phase anode, a sixth arm 110_6 composed of the plurality of sub-modules SM_1, SM_2, ..., SM_n for the C-phase cathode, a first arm reactor 120a_1 connected to the arm 110_1 in series, a second arm reactor 120a_2 connected to the second arm 110_2 in series, and a third arm reactor 120b_1 connected to the third arm 110_3 in series, a fourth arm reactor 120b_2 connected to the fourth arm 110_4 in series, a fifth arm reactor 120c_1 connected to the fifth arm 110_5 in series, and a sixth arm reactor 120c_2 connected to the sixth arm 110_6 in series.

In this case, the plurality of sub-modules and arm reactors for one phase may constitute a cluster. Specifically, the plurality of sub-modules and arm reactors for the anode and cathode included in one phase may constitute a cluster. In FIG. 1, the modular multi-level converter 100 includes a A-phase cluster 130 composed of a plurality of sub-modules and arm reactors for phase A, and a B-phase cluster 132 composed of a plurality of sub-modules and arm reactors for phase B and a C-phase cluster 134 composed of a plurality of sub-modules and arm reactors for phase C.

Each cluster composed of the plurality of sub-modules and arm reactors may be connected to three phases of a power system, that is, phases A, B and C.

Figure 3:
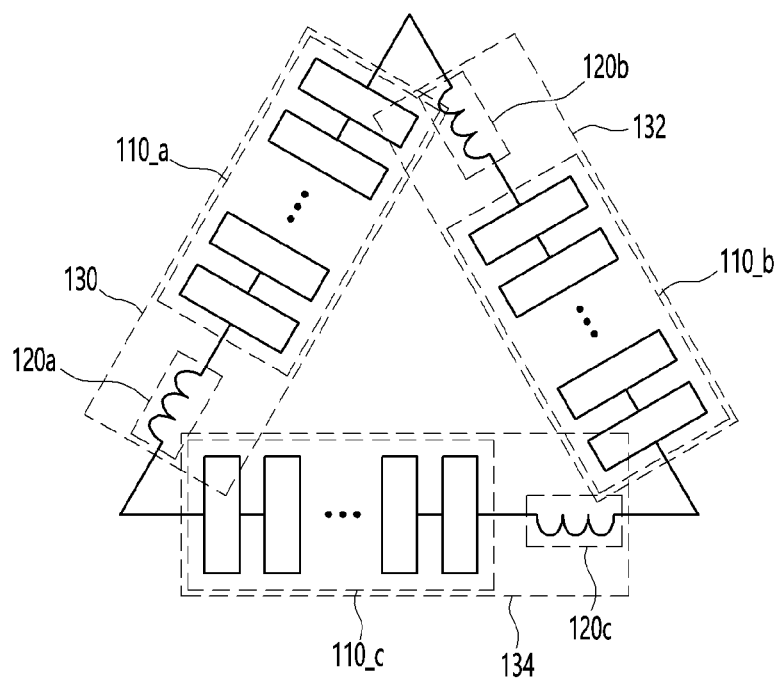
FIG. 3 is a circuit diagram showing a second connection form of the modular multi-level converter.
Figure 4:
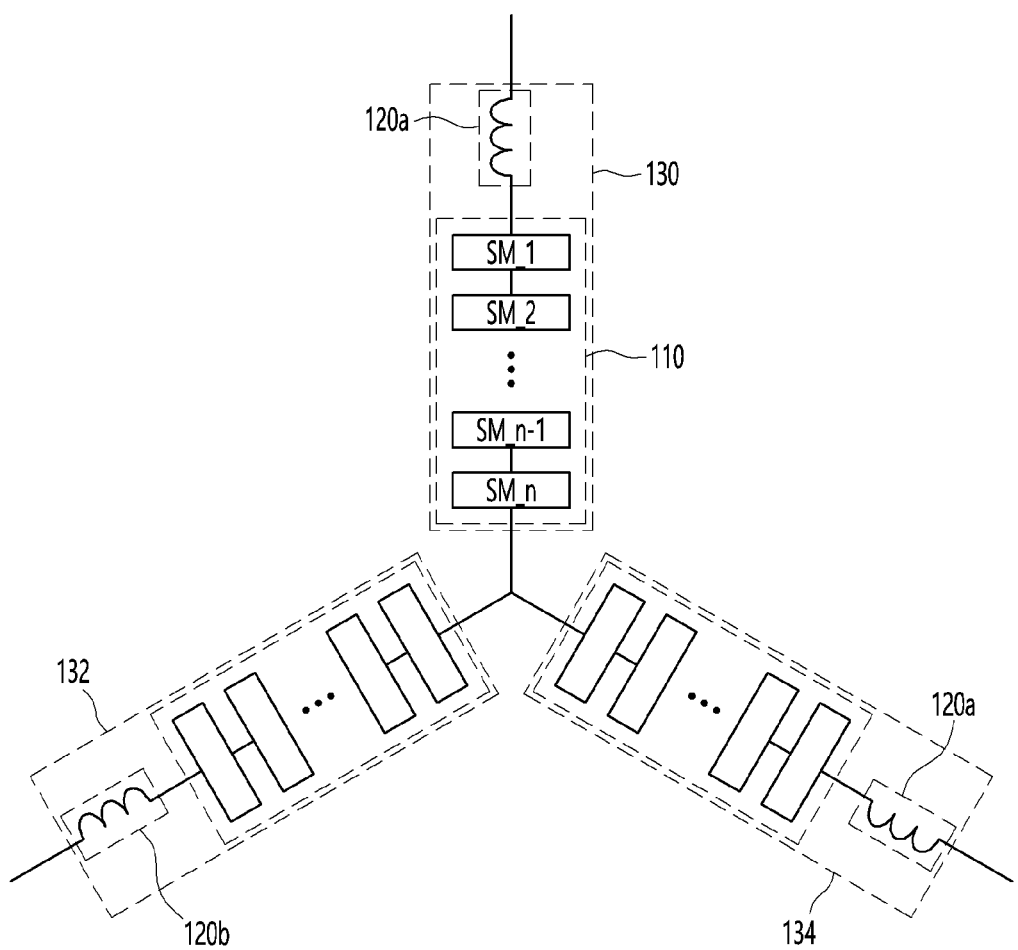
FIG. 4 is a circuit diagram showing a third connection form of the modular multi-level converter.

FIG. 3 is a circuit diagram showing a second connection form of the modular multi-level converter, and FIG. 4 is a circuit diagram showing a third connection form of the modular multi-level converter.

In an embodiment of the present disclosure, the second connection form of the modular multi-level converter may be a delta connection topology, and in an embodiment of the present disclosure, the third connection form of the modular multi-level converter may be a star connection topology.

First, referring to FIG. 3, each of the delta-connected phase clusters 130, 132, and 134 may include a plurality of sub-modules 110_a, 110_b, and 110_c and arm reactors 120a, 120b, and 120c connected in series to each other, respectively.

The modular multi-level converter of the star connection in FIG. 4 is identical to the modular multi-level converter of the delta connection in FIG. 3 except for the connection structure. Therefore, in the description of the modular multi-level converter of the star connection, the same reference numerals will be assigned to the same components as those of the modular multi-level converter of the delta connection.

Each of the phase clusters 130, 132, and 134 may include a plurality of sub-modules 110 and arm reactors 120a, 120b, and 120c connected in series to each other.

That is, in the modular multi-level converter, each three-phase cluster has one arm 110 composed of the plurality of sub-modules SM_1, SM_2, ..., SM_n and one arm reactor 120 corresponding thereto.

These arm reactors are connected in series with the sub-modules to prevent damage to sub-modules due to short-circuit. In addition, the arm reactor is connected in series to the sub-module in order to limit the current flowing to the load within allowable current.

The capacity of the arm reactor increases as the number of sub-modules increases. Therefore, when installing the large-capacity multi-level converter 100, a large-capacity arm reactor is used. However, as the capacity of the reactor increases, the physical size of the reactor also increases, and accordingly, there is a problem in that the volume of the entire product increases.

In order to solve this problem, the modular multi-level converter 100 of the present disclosure may use a plurality of individual reactors 121 instead of one arm reactor 120 corresponding to one arm 110 composed of n sub-modules SM. For example, assuming that the capacity of one arm reactor 120 is L, n individual reactors 121 according to an embodiment of the present disclosure may be provided, and the capacity of each reactor 121 may be L/n. Accordingly, the sum of the capacities of the individual reactors 121 may be equal to that of one conventional arm reactor 120. Although, in the above-described embodiment, the number of sub-modules SM and the number of individual reactors 121 have been described as the same, this is only an example and the number of individual reactors 121 may not be equal to the number of sub-modules SM according to design.

Hereinafter, the conventional arm reactor 120 and the plurality of individual reactors 121 of the present disclosure will be separately described.

Next, the arrangement structure of the individual reactor according to the embodiment of the present disclosure will be described with reference to FIGS. 5 to 6.

Figure 5:
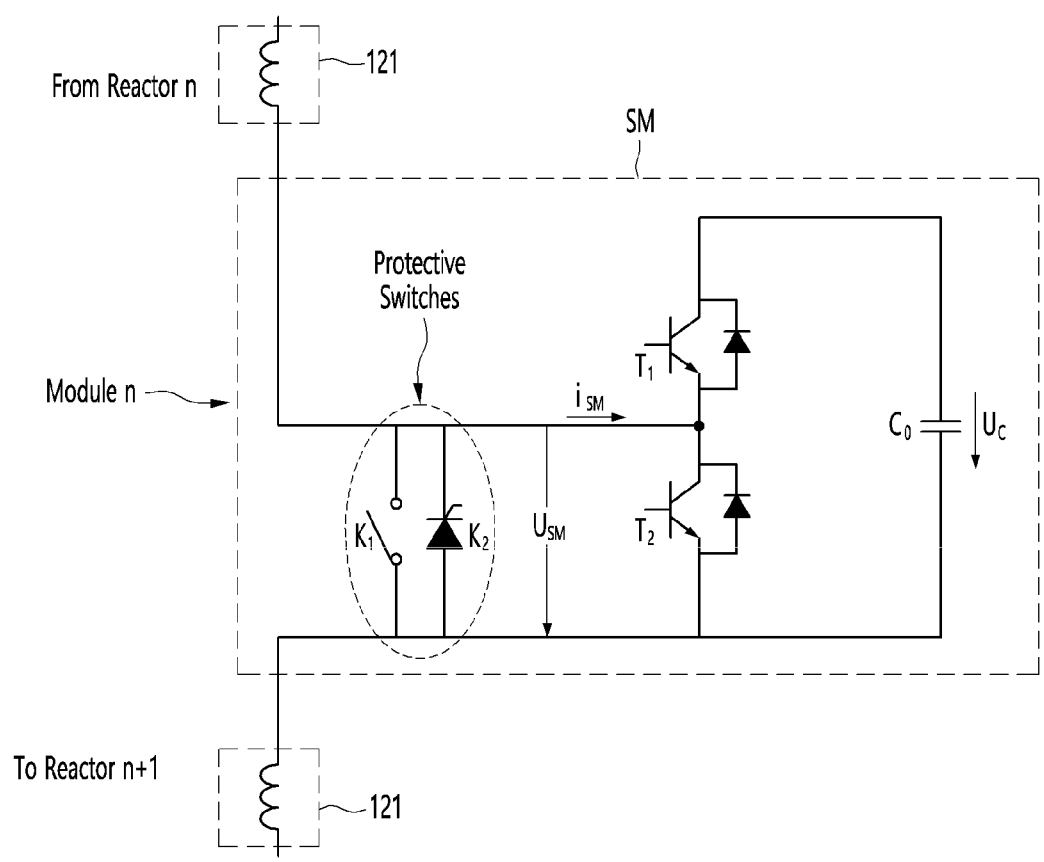
FIG. 5 is a circuit diagram showing in detail the arrangement structure of individual reactors and sub-modules according to a first embodiment in the modular multi-level converter of the present disclosure.

FIG. 5 is a circuit diagram showing in detail the arrangement structure of individual reactors and sub-modules according to a first embodiment in the modular multi-level converter of the present disclosure.

First, the sub-module SM included in the modular multi-level converter may include a capacitor for storing power energy, a power semiconductor device, a switching device, and a protection circuit.

The size of the capacitor may be set in proportion to the size of the modular multi-level converter 100. The capacitance of a capacitor may be proportional to the square of a voltage. Accordingly, an appropriate operating voltage of the sub-module SM may be set in consideration of this.

The protection switch is a switch for protecting the sub-module SM. The protection switch may be implemented as a By-Pass switch. In general, the modular multi-level converter 100 is designed with sufficient redundancy in order to prevent the system from being stopped due to a failure in one sub-module SM. Therefore, the by-pass switch bypasses the failed sub-module SM and operates the redundant sub-module SM.

An n-th sub-module (Module n) may include two IGBTs T1 and T2, a capacitor CO, and protection switches K1 and K2. Although, in FIG. 5, a half-bridge type including two IGBTs T1 and T2 is shown as an example of a sub-module SM, the sub-module SM is a full bridge type including four IGBTs T1, T2, T3 and T4.

Although not shown in the figure, the n-th sub-module (Module n) is connected in series with an (n−1)-th sub-module (Module n−1) and an (n+1)-th sub-module (Module n+1). The individual reactor 121 according to an embodiment of the present disclosure may be disposed between the (n−1)-th sub-module (Module n−1) and the n-th sub-module (Module n), and may be disposed between the n-th sub-module (Module n) and the (n+1)-th sub-module (Module n+1).

In this case, current input from the (n−1)-th sub-module (Module n−1) passes through the n-th individual reactor 121, passes through the n-th sub-module (Module n), passes through the (n+1)-th individual reactor 121, and flows to the (n+1)-th sub-module (Module n+1).

That is, one end of a first sub-module SM among the plurality of sub-modules SM_1, SM_2, . . . , SM_n may be connected to a first individual reactor, and the other end of the first sub-module SM may be connected to a second individual reactor.

According to the embodiment of FIG. 5, the individual reactor 121 of the present disclosure can serve as a connection bus connecting sub-modules SM connected in series to each other, and the individual reactors 121 and the sub-modules SM may be placed in the same space.

Meanwhile, the individual reactor 121 according to the embodiment of the present disclosure may be disposed inside the sub-module SM. At this time, the inside of the sub-module SM may mean the inside of a housing forming the appearance of the sub-module SM.

Figure 6:
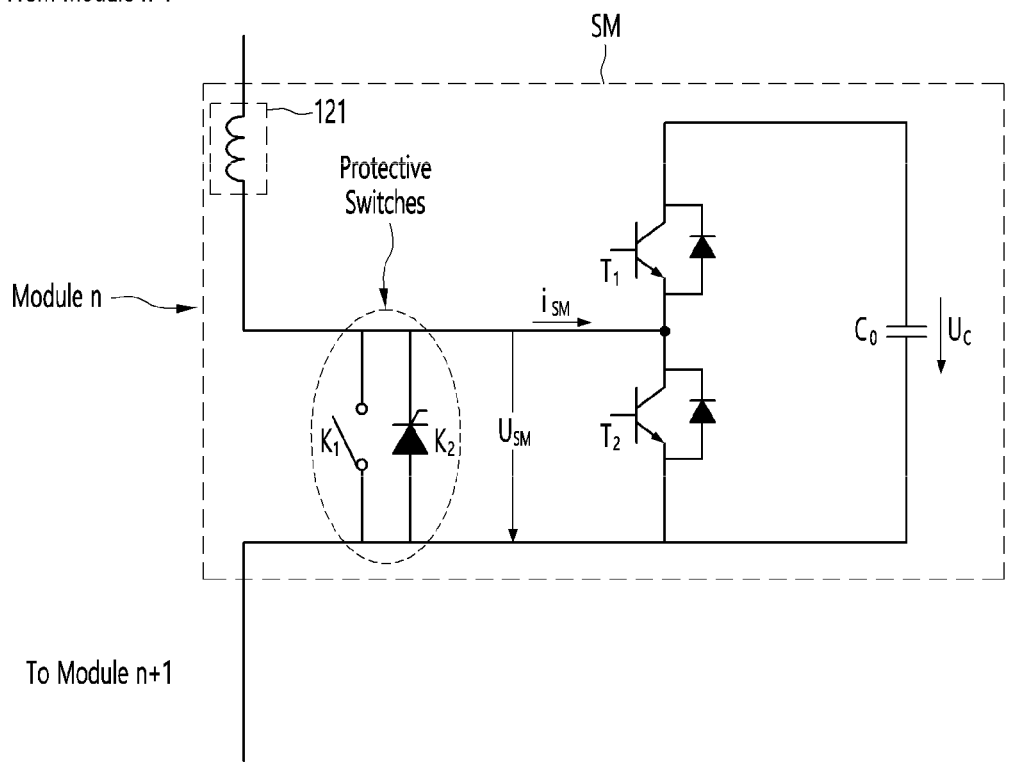
FIG. 6 is a circuit diagram showing in detail the arrangement structure of individual reactors and sub-modules according to a second embodiment in the modular multi-level converter of the present disclosure.

FIG. 6 is a circuit diagram showing in detail the arrangement structure of individual reactors and sub-modules according to a second embodiment in the modular multi-level converter of the present disclosure.

Referring to FIG. 6, a dotted line surrounding the sub-module SM may mean a housing forming the appearance of the sub-module SM. According to the embodiment, the individual reactor 121 may be disposed inside the housing of the sub-module SM.

According to this embodiment, the reactor may not be exposed to the outside of the sub-module SM. That is, there is an advantage in that the reactor is not exposed to a valve tower where the sub-module SM is installed.

Next, a connection form of a modular multi-level converter to which a reactor arrangement structure according to an embodiment of the present disclosure is applied will be described with reference to FIGS. 7 to 9.

Figure 7:
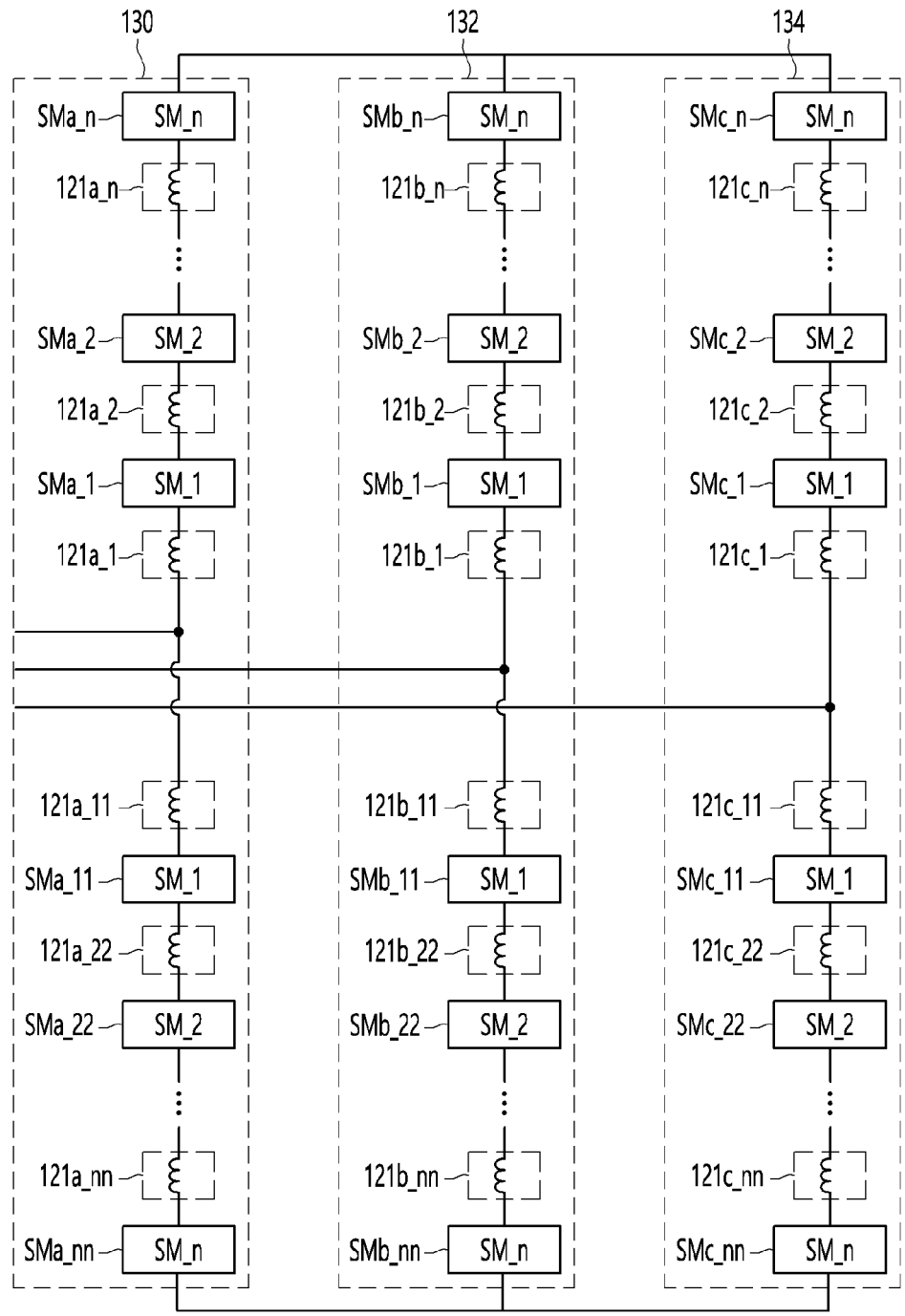
FIG. 7 is a circuit diagram showing a first connection form of the modular multi-level converter including individual reactors and sub-modules according to an embodiment of the present disclosure.
Figure 8:
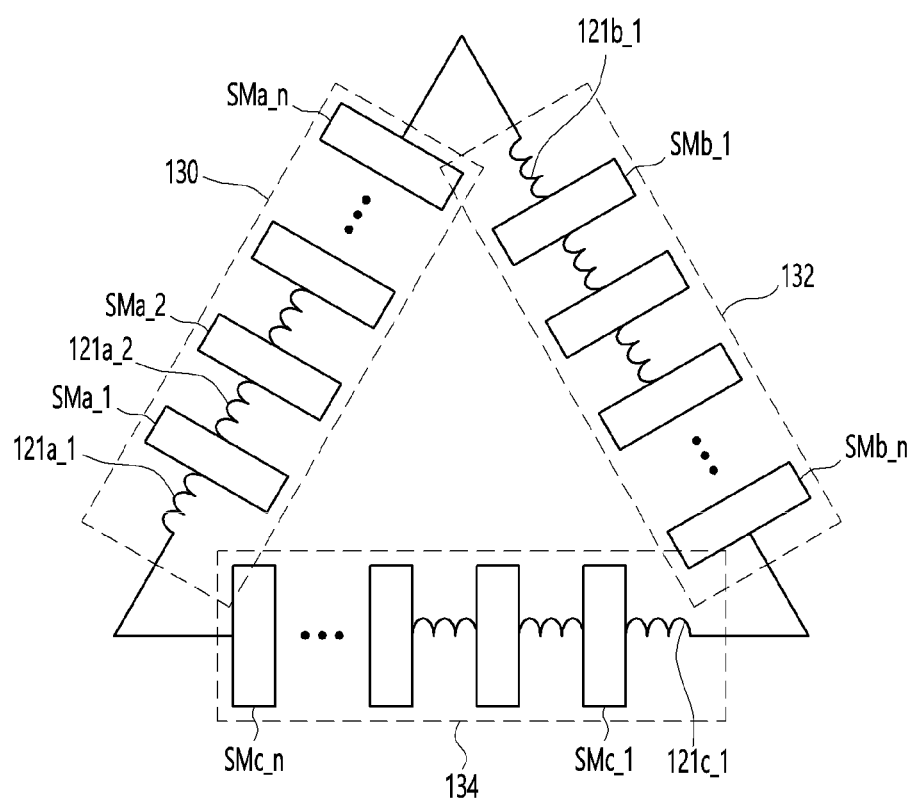
FIG. 8 is a circuit diagram showing a second connection form of the modular multi-level converter including individual reactors and sub-modules according to an embodiment of the present disclosure.
Figure 9:
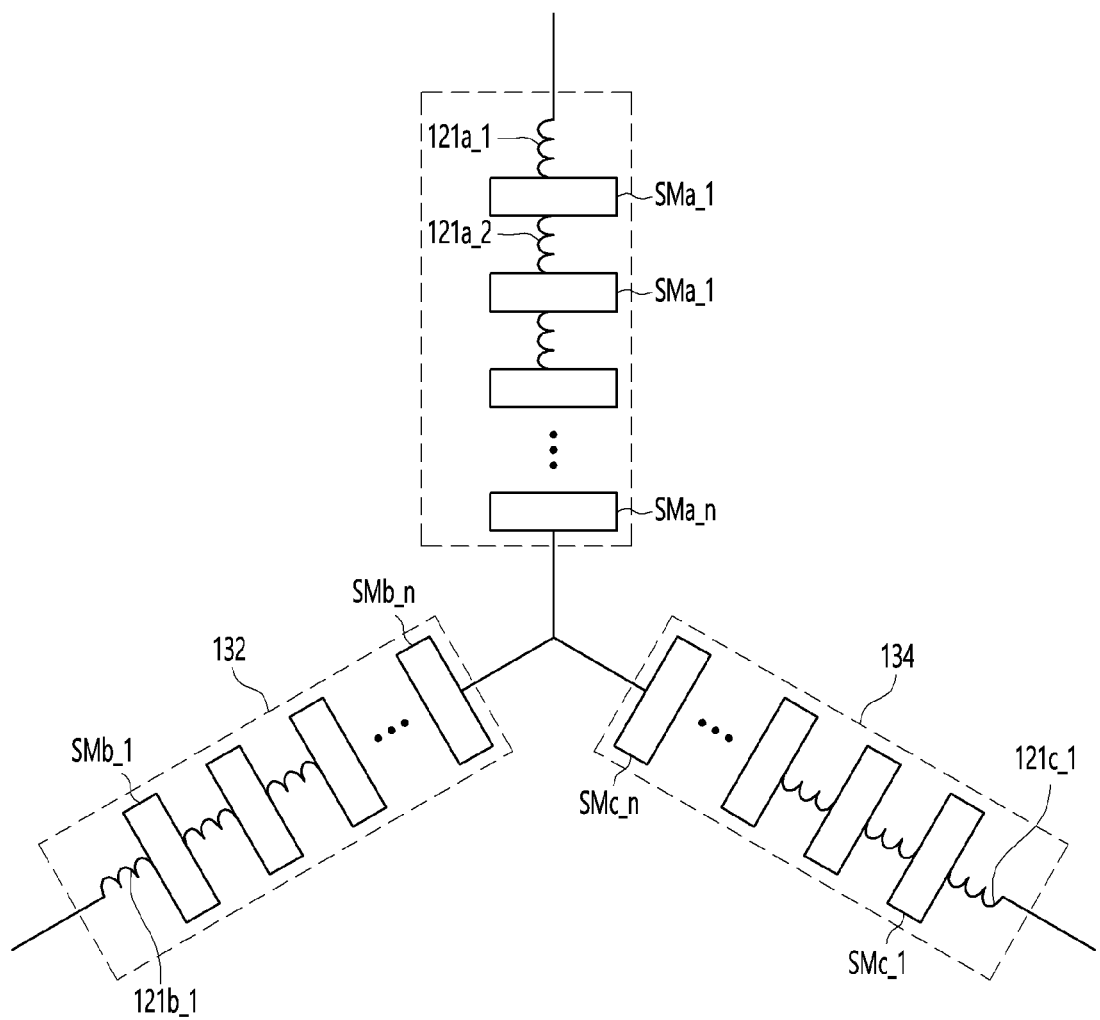
FIG. 9 is a circuit diagram showing a third connection form of the modular multi-level converter including individual reactors and sub-modules according to an embodiment of the present disclosure.

FIG. 7 is a circuit diagram showing a first connection form of the modular multi-level converter including individual reactors and sub-modules according to an embodiment of the present disclosure, FIG. 8 is a circuit diagram showing a second connection form of the modular multi-level converter including individual reactors and sub-modules according to an embodiment of the present disclosure, and FIG. 9 is a circuit diagram showing a third connection form of the modular multi-level converter including individual reactors and sub-modules according to an embodiment of the present disclosure.

Referring to FIG. 7, the modular multi-level converter of the present disclosure may include a plurality of sub-modules SMa_1, SMa_2, . . . , SMa_n connected in series and a plurality of individual reactors $121a\_1$, $121a\_2$, . . . , $121a\_n$ disposed between the sub-modules for A-phase anode, a plurality of sub-modules SMa_11, SMa_22, . . . , SMa_nn connected in series and a plurality of individual reactors $121a\_11$, $121a\_22$, . . . , $121a\_nn$ disposed between the sub-modules for A-phase cathode, a plurality of sub-modules SMb_1, SMb_2, . . . , SMb_n connected in series and a plurality of individual reactors $121b\_1$, $121b\_2$, . . . , $121b\_n$ disposed between the sub-modules for B-phase anode, a plurality of sub-modules SMb_11, SMb_22, . . . , SMb_nn connected in series and a plurality of individual reactors $121b\_11$, $121b\_22$, . . . , $121b\_nn$ disposed between the sub-modules for B-phase cathode, a plurality of sub-modules SMc_1, SMc_2, . . . , SMc_n connected in series and a plurality of individual reactors $121c\_1$, $121c\_2$, . . . , $121c\_n$ disposed between the sub-modules for C-phase anode, and a plurality of sub-modules SMc_11, SMc_22, . . . , SMc_nn connected in series and a plurality of individual reactors $121c\_11$, $121c\_22$, . . . , $121c\_nn$ disposed between the sub-modules for C-phase cathode.

Referring to FIG. 8, the modular multi-level converter of the present disclosure may include delta-connected first to third phase (or a to c phase) clusters 130, 132 and 134, and each of the first to third phase clusters may include a plurality of sub-modules SMa_1, SMa_2, . . . , SMa_n connected in series and a plurality of individual reactors $121a\_1$, $121a\_2$, . . . , $121a\_n$ disposed between the sub-modules for A phase, a plurality of sub-modules SMb_1, SMb_2, . . . , SMb_n connected in series and a plurality of individual reactors $121b\_1$, $121b\_2$, . . . , $121b\_n$ disposed between the sub-modules for B phase, and a plurality of sub-modules SMc_1, SMc_2, . . . , SMc_n connected in series and a plurality of individual reactors $121c\_1$, $121c\_2$, . . . , $121c\_n$ disposed between the sub-modules for C phase.

Referring to FIG. 9, the modular multi-level converter of the present disclosure may include star-connected first to third phase (or a to c phase) clusters 130, 132 and 134, and each of the first to third phase clusters may include a plurality of sub-modules SMa_1, SMa_2, . . . , SMa_n connected in series and a plurality of individual reactors 121a_1, 121a_2, . . . , 121a_n disposed between the sub-modules for A phase, a plurality of sub-modules SMb_1, SMb_2, . . . , SMb_n connected in series and a plurality of individual reactors 121b_1, 121b_2, . . . , 121b_n disposed between the sub-modules for B phase, and a plurality of sub-modules SMc_1, SMc_2, . . . , SMc_n connected in series and a plurality of individual reactors 121c_1, 121c_2, . . . , 121c_n disposed between the sub-modules for C phase.

The first to third phase clusters 130, 132 and 134 of the modular multi-level converter 100 of the present disclosure may be connected to each phase of a 3-phase power system in parallel.

Although, in the above-described embodiment, individual reactors corresponding in number to the number of the plurality of sub-modules have been described, the number of individual reactors of the present disclosure may not be exactly equal to the number of sub-modules. That is, in the modular multi-level converter 100 of the present disclosure, the number of sub-modules SM may be less than or equal to the number of individual reactors 121.

According to the present disclosure, by arranging the reactor in or between sub-modules, there is an advantage in utilizing space and reducing the volume of the product.

According to the present disclosure, since a separate space for installing a reactor is not required, product installation costs are reduced.

The above description is merely an example of the technical idea of the present disclosure, and various modifications and variations may be made to those skilled in the art without departing from the essential characteristics of the present disclosure.

Therefore, the embodiments disclosed in the present disclosure are not intended to limit the technical idea of the present disclosure, but are intended to explain the technical idea of the present disclosure, and the scope of the technical idea of the present disclosure is not limited by these embodiments.

The scope of the present disclosure should be interpreted by the claims below, and all technical ideas within the scope equivalent thereto should be construed as being included in the scope of the present disclosure.

The invention claimed is:

1. A modular multi-level converter comprising:
a cluster;
wherein the cluster comprises:
a plurality of sub-modules connected in series; and
a plurality of individual reactors connected to the sub-modules in series, and
wherein each of the plurality of individual reactors is disposed between two sub-modules of the plurality of sub-modules,
wherein a first end of a first individual reactor among the plurality of individual reactors is connected in series with one end of a first sub-module among the plurality of sub-modules and connected to one end of a first protection switch of the first sub-module which is implemented as a first By-Pass switch of the first sub-module, and a second end of the first individual reactor is connected in series with one end of a second sub-module among the plurality of sub-modules and connected to a first end of a second protection switch of the second sub-module which is implemented as a second By-Pass switch of the second sub-module, and
wherein a second end of the protection switch of the second sub-module is connected in series with the one end of a second individual reactor among the plurality of individual reactors.

2. The modular multi-level converter of claim 1, wherein the number of submodules is less than or equal to the number of individual reactors.

3. The modular multi-level converter of claim 1, wherein the plurality of sub-modules and the plurality of individual reactors are disposed in the same space, wherein each of the plurality of individual reactors is configured to serve as a connection bus connecting sub-modules connected in series to each other.

4. The modular multi-level converter of claim 1, wherein any one of the plurality of individual reactors is disposed inside of a housing forming an appearance of the sub-module.

5. The modular multi-level converter of claim 1, wherein a capacity of each of the plurality of individual reactors is the same.

6. A modular multi-level converter comprising:
first to third phase clusters connected to each phase of a three-phase power system in parallel,
wherein each of the first to third phase clusters comprises:
a plurality of sub-modules connected in series; and
a plurality of individual reactors connected to the sub-modules in series, and
wherein each of the plurality of individual reactors is disposed between two of the plurality of sub-modules,
wherein a first end of a first individual reactor among the plurality of individual reactors is connected in series with one end of a first sub-module among the plurality of sub-modules and connected to one end of a first protection switch of the first sub-module which is implemented as a first By-Pass switch of the first sub-module, and a second end of the first individual reactor is connected in series with one end of a second sub-module among the plurality of sub-modules and connected to a first end of a second protection switch of the second sub-module which is implemented as a second By-Pass switch of the second sub-module, and
wherein a second end of the protection switch of the second sub-module is connected in series with one end of a second individual reactor among the plurality of individual reactors.

7. The modular multi-level converter of claim 6, wherein the number of submodules is less than or equal to the number of individual reactors.

8. The modular multi-level converter of claim 6, wherein the plurality of sub-modules and the plurality of individual reactors are disposed in the same space, wherein each of the plurality of individual reactors is configured to serve as a connection bus connecting sub-modules connected in series to each other.

9. The modular multi-level converter of claim 6, wherein any one of the plurality of individual reactors is disposed inside a housing forming an appearance of the sub-module.

10. The modular multi-level converter of claim 6, wherein a capacity of each of the plurality of individual reactors is the same.

* * * * *